US007685188B2

(12) United States Patent
Copeland et al.

(10) Patent No.: US 7,685,188 B2
(45) Date of Patent: Mar. 23, 2010

(54) AUTOMATED GENERATION OF COMPUTER-EXECUTABLE COMPENSATION PROCEDURES FOR PREVIOUSLY EXECUTED METHODS

(75) Inventors: George P. Copeland, Redmond, WA (US); Luis Felipe Cabrera, Bellevue, WA (US)

(73) Assignee: Microsoft Corporation

( * ) Notice: Subject to any disclaimer, the term of this patent is extended or adjusted under 35 U.S.C. 154(b) by 1312 days.

(21) Appl. No.: 10/763,526

(22) Filed: Jan. 23, 2004

(65) Prior Publication Data

US 2005/0177774 A1 Aug. 11, 2005

(51) Int. Cl.
*G06F 17/30* (2006.01)
(52) U.S. Cl. ...................................... 707/684
(58) Field of Classification Search .................. None
See application file for complete search history.

(56) References Cited

U.S. PATENT DOCUMENTS

| | | | | |
|---|---|---|---|---|
| 4,394,535 A * | 7/1983 | Bingham et al. | ............... | 381/17 |
| 5,224,706 A * | 7/1993 | Bridgeman et al. | ........... | 463/13 |
| 5,557,798 A | 9/1996 | Skeen et al. | ................. | 395/650 |
| 5,649,185 A * | 7/1997 | Antognini et al. | .............. | 707/9 |
| 5,812,996 A * | 9/1998 | Rubin et al. | ................... | 707/2 |
| 5,870,545 A * | 2/1999 | Davis et al. | ................. | 709/201 |
| 5,892,981 A * | 4/1999 | Wiggers | ....................... | 710/58 |
| 5,940,839 A * | 8/1999 | Chen et al. | ................... | 707/202 |
| 5,963,926 A * | 10/1999 | Kumomura | ................. | 705/41 |
| 6,119,129 A * | 9/2000 | Traversat et al. | ............ | 707/202 |
| 6,130,918 A * | 10/2000 | Humphrey et al. | .......... | 375/295 |
| 6,148,290 A * | 11/2000 | Dan et al. | ....................... | 705/1 |
| 6,295,610 B1* | 9/2001 | Ganesh et al. | ................ | 714/19 |
| 6,757,708 B1* | 6/2004 | Craig et al. | ................. | 709/203 |
| 2002/0099684 A1* | 7/2002 | Ardoin et al. | .................. | 707/1 |
| 2002/0133480 A1* | 9/2002 | Boguraev et al. | .............. | 707/1 |
| 2002/0174108 A1* | 11/2002 | Cotner et al. | .................. | 707/3 |
| 2003/0046298 A1* | 3/2003 | Weedon | ....................... | 707/102 |
| 2003/0158843 A1* | 8/2003 | Boguraev et al. | .............. | 707/5 |
| 2003/0208500 A1* | 11/2003 | Daynes et al. | .............. | 707/100 |
| 2004/0049612 A1* | 3/2004 | Boyd et al. | .................... | 710/52 |
| 2004/0062248 A1* | 4/2004 | Nagarajan et al. | ........... | 370/394 |

OTHER PUBLICATIONS

Brown et al, "Undo for Operators: Building an Undoable E-mail Store", Jun. 2003, USENIX 2003 Technical Conference, 14 pages, <Retrieved from internet Jun. 15, 2009>.*

(Continued)

*Primary Examiner*—Khanh B Pham
(74) *Attorney, Agent, or Firm*—Workman Nydegger (57) ABSTRACT

Mechanisms for executing a transaction such that it may be undone after being committed. The mechanism maintains a mapping between each of a number of groups of one or more direct methods with a corresponding group of one or more inversion methods, that, when executed, causes the computing system to at least partially undo the effects of the execution of the corresponding group of direct methods. Upon beginning a transaction, the computing system runs a one or more groups of one or more direct methods that are part of the transaction. The mapping is then used to identify the corresponding group(s) of inversion methods. The identities of each corresponding group of inversion methods are then saved to a compensation record. The transaction is then committed, and the compensation record is saved to a persistent media along with a transaction identifier.

42 Claims, 5 Drawing Sheets

OTHER PUBLICATIONS

O'Brien et al, "Undo for anyone, anywhere, anytime", Sep. 2004, Proceedings of the 11th workshop on ACM SIGOPS European workshop, ACM Press, <Retrieved from ACM Portal Jun. 15, 2009>.*

Edwards et al, "A Timewarp: techniques for autonomous collaboration", Oct. 1997, In Proceedings of SIGCHI conference on Human factors in computing systems, p. 218-225, <Retrieved from ACM Portal Jun. 16, 2009>.*

Edwards et al, "A Temporal Model for Multi-level Undo and Redo", Nov. 2000, In Proceedings of the 13th annual ACM symposium on User interface software and technology, UIST 2000., p. 31-40, <Retrieved from ACM Portal Jun. 16, 2009>.*

Efficient Message Dispatch in Object-Oriented Systems Mayur Naik and Rejeev Kumar Mar. 2000 p. 49-58 ACM SIGPLAN.

Cybernetics and Systems-Towards a Unified Messaging Environment Over the Internet Leonard Chong, Siu Cheung Hui and Chai Kiat Yeo 1999 p. 533-549.

ECOOP ' 95 Object-Oriented Programming Message Dispatch on Pipelined Processors Karel Driesen, Urs Holzle and Jan VItek 1995 p. 252-282.

* cited by examiner

AUTOMATED GENERATION OF COMPUTER-EXECUTABLE COMPENSATION PROCEDURES FOR PREVIOUSLY EXECUTED METHODS

BACKGROUND OF THE INVENTION

1. The Field of the Invention

The present invention relates to computing technology; and more specifically, to the automated generation of computer-executable compensation procedures that, when executed, at least partially undo the effects of previously executed methods.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

The hardware capability of computing systems is rapidly advancing. To utilize this increased capability, software is performing an ever increasing variety of functionality. Such complex software is drafted by computer programmers who collectively draft often many thousands of lines of code. This complexity is made manageable by drafting subroutines or methods that perform more specific actions. The methods are then interrelated to perform the more complex functionality of the software as a whole. These methods receive zero or more input parameters, perform the specific function using those input parameters (if any), and then generate zero or more output parameters.

On occasion, it may be desirable for software to undo actions that it previously performed. Often, however, one or more actions are part of a larger transaction. Once the transaction is committed, however, the transaction is typically not undone. Even if the transaction is to be undone, custom software would typically need to be developed for this purpose. What would therefore be advantageous are mechanisms in which the effects of transactions may be at least partially undone even after the transaction is already committed, and without require custom software to undo the transaction.

BRIEF SUMMARY OF THE INVENTION

The foregoing problems with the prior state of the art are overcome by the principles of the present invention, which are directed towards mechanisms for executing a transaction of one or more methods in a manner that the effects of the transaction may be at least partially undone even though a custom inversion process was not previously constructed for the transaction by its programmer.

The mechanism maintains a mapping between each of a number of groups of one or more direct methods with a corresponding group of one or more inversion methods. A group of direct methods may be a single method, while a group of inversion methods may also be a single method, although this is not required. A group of inversion methods, when executed, causes the computing system to at least partially undo the effects of the execution of the corresponding group of direct methods. The inversion methods may also include a listing of one or more parameters for the direct method that should be included in the inversion method for proper inversion. For example, if the direct method performs an add of a name to a database, the inversion method will be to delete a name from the database, where the name is required to complete the deletion.

Upon beginning a transaction, the computing system runs one or more groups of one or more direct methods that are part of the transaction. The mapping is then used to identify the corresponding group(s) of inversion methods. The mapping may also be used to determine which actual parameter values used when executing the direct methods should be saved and associated with the inversion methods. The identity of each corresponding group of inversion methods, and their associated one or more actual parameter values are then saved to a compensation record. The transaction is then committed, and the compensation record is saved to persistent memory (or other durable storage such as magnetic disks) along with a transaction identifier.

This may be performed for multiple transactions. If one or more transactions should be undone, even if the transactions are already committed, the corresponding compensation record may be used to undo the transactions. The transactions that each have a compensation record may be part of a larger transaction that is long running. Each time a transaction is committed, the compensation record may be saved to a persistent media. Accordingly, transactions that are part of the larger transaction may be committed and undone as appropriate. This is significant because in long running transactions, many things can disrupt the transaction. Accordingly, there is need for flexibility in accommodating such disruptions. The ability to undo (as much as is feasible) a transaction that is part of that larger transaction is thus useful.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for executing a transaction of one or more methods in a manner that the effects of the transaction may be at least partially undone even after being committed and even though a custom inversion process was not previously constructed for the transaction. The mechanism maintains a mapping between each of a number of groups of one or more direct methods with a corresponding group of one or more inversion methods. Each group of inversion methods, when executed, causes the computing system to at least partially undo the effects of the execution of the corresponding group of direct methods. Upon beginning a transaction, the computing system runs one or more groups of one or more direct methods that are part of the transaction. The mapping is then used to identify the corresponding group(s) of inversion methods. The identities of each corresponding group of inversion are then saved to a compensation record. The transaction is then committed, and the compensation record is saved to a persistent media along with an appropriate transaction identifier.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

Figure 1:
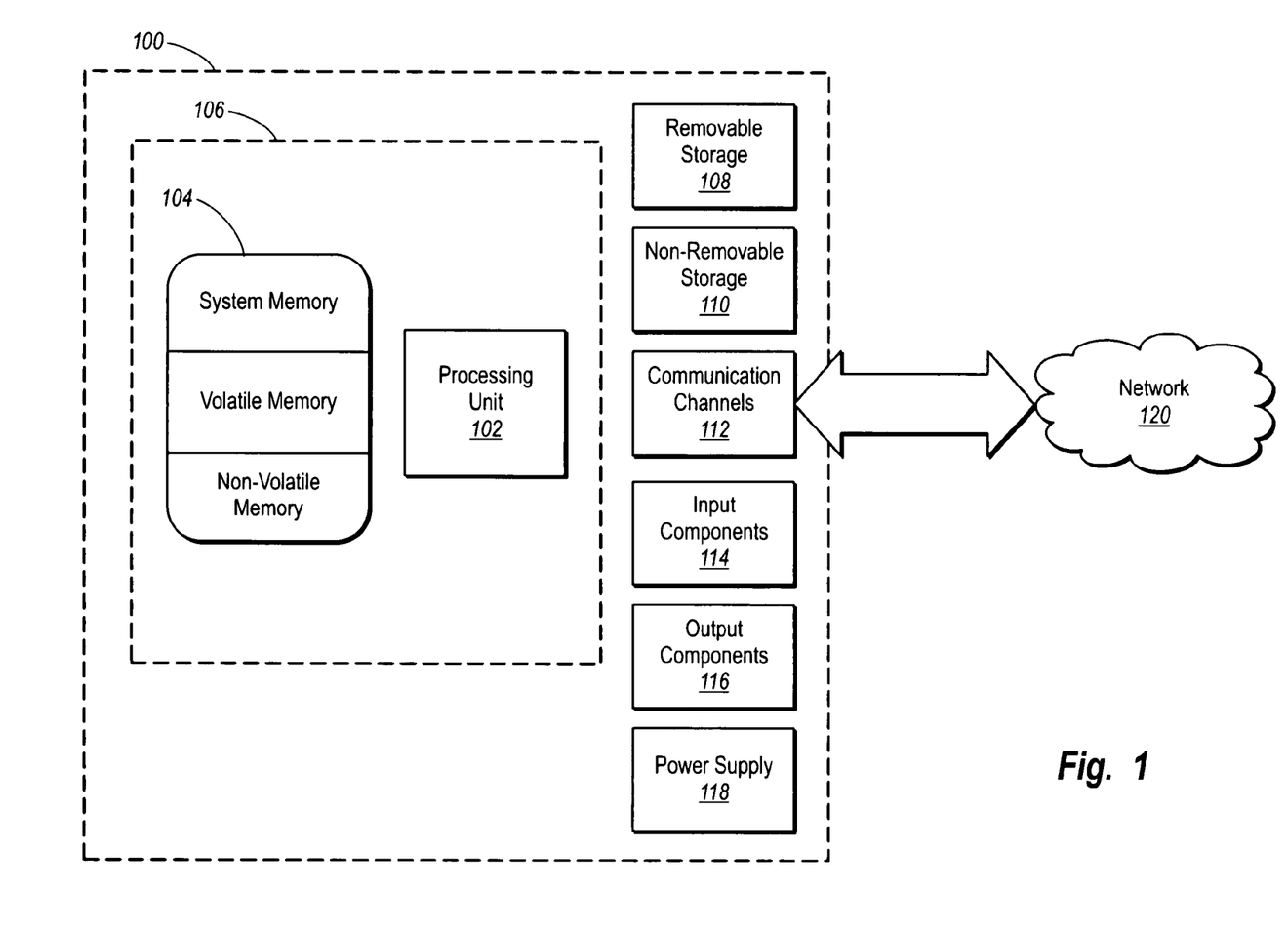
FIG. 1 illustrates a suitable computing system that may implement features of the present invention.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware. FIG. 1 shows a schematic diagram of an example computer architecture usable for these devices.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
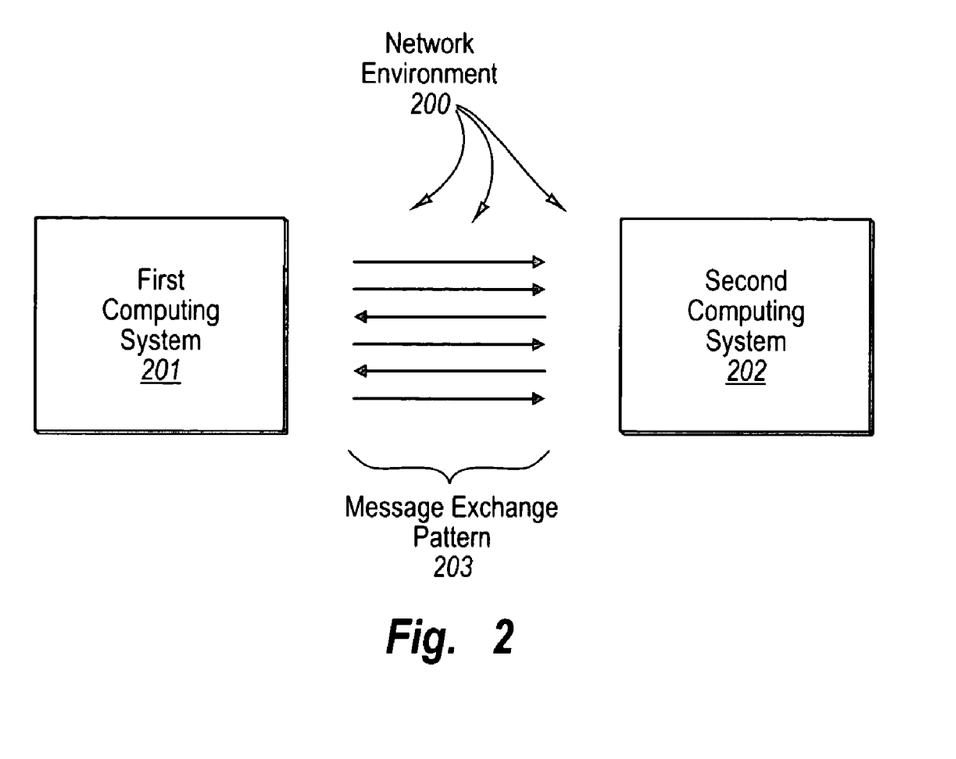
FIG. 2 illustrates a network environment in which the principles of the present invention may be employed.

FIG. 2 illustrates a network environment 200 in which two computing systems communicate to accomplish a particular task. In particular, the first computing system 201 communicates with the second computing system 202. In order to accomplish the task, the computing systems exchange messages in a particular pattern of exchange represented generally by message exchange pattern 203. The particular pattern of message exchange defines which computing system is to send which message at any given point in the message exchange. The message exchange pattern depends on the task to be accomplished, and the protocols used to exchange messages. The messages may be any electronic message such as, for example, a HyperText Transport Protocol (HTTP) message or a Simple Object Access Protocol (SOAP) message. The receipt of each message may result in a transaction of one or more direct methods being performed as described below with respect to FIGS. 3 through 7.

The first requesting computing system 201 and the second computing system 202 may be structured as described above for the computing system although this is not required. In this description and in the claims, a "computing system" is defined as any device or system that has a system memory, and at least one processor capable of executing instructions from system memory. Also, the use of the terms "first", "second" and so forth to modify an item is only intended to distinguish one item from another, and does not imply any sort of sequential ordering per se.

Figure 3:
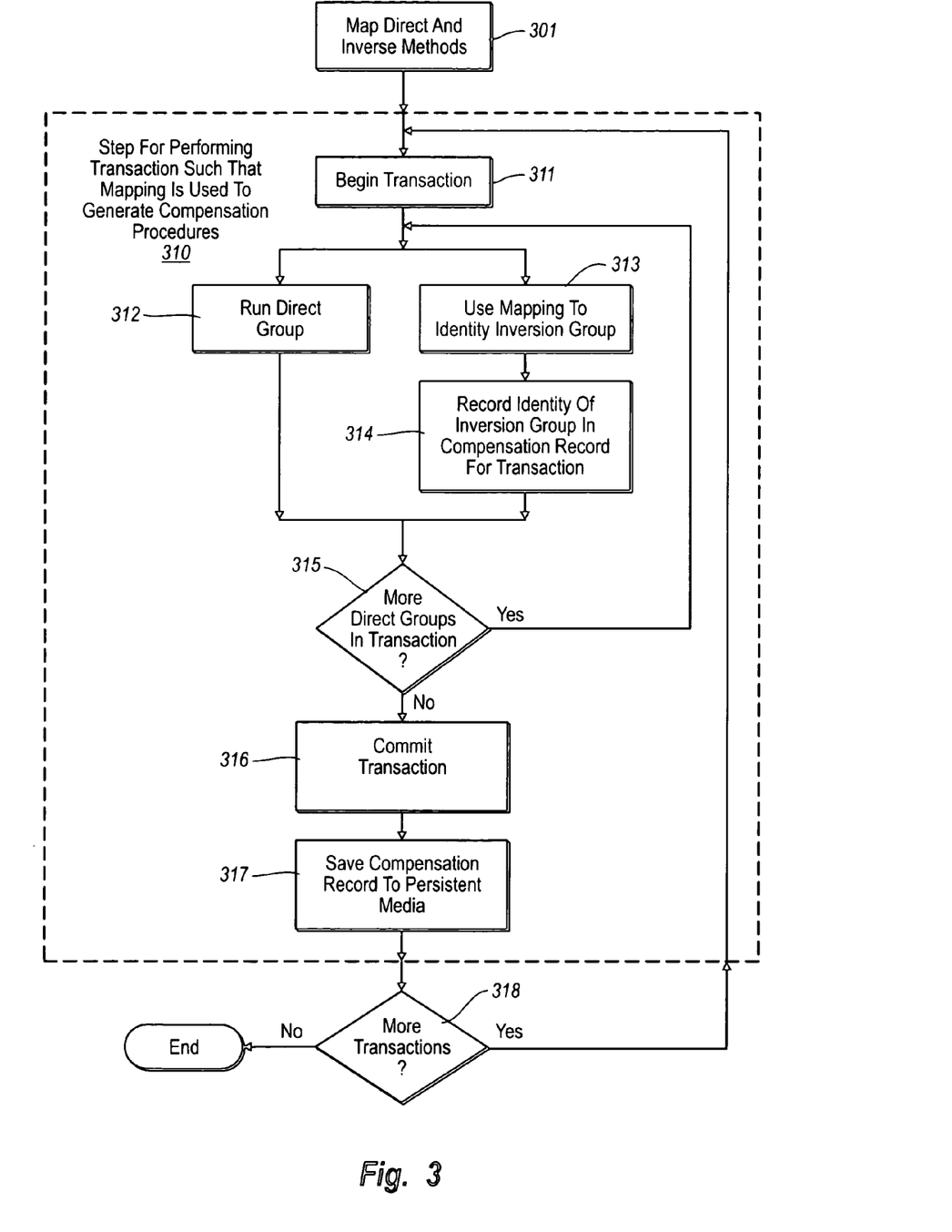
FIG. 3 illustrates a flowchart of a method for executing a transaction of one or more methods in a manner that the effects of the transaction may be at least partially undone even though a custom inversion process was not previously constructed for the transaction.

FIG. 3 illustrates flowchart of a method 300 for executing a transaction of one or more methods in a manner that the effects of the transaction may be at least partially undone even though a custom inversion process was not previously developed for the transaction. As mentioned above, the receipt of a message in the message exchange pattern 203 may result in particular transactions being initiated.

Each transaction may be performed using one or more methods. The methods represent procedures that receive zero or more parameters, perform a corresponding function, and then return zero or more parameters. The methods are executed by the computing system having its processors read and execute code corresponding to the method. When executed in the computing system 100 of FIG. 1, the processor 102 executes executable code representing various methods from the memory 104. There are typically numerous methods that may be implemented on a computing system. The variety of methods that may be performed is limited only by the diversity of software on the computing system.

Methods that are executed by the computing system to accomplish a particular transaction will be referred to as "direct" methods. Groups of one or more direct methods will often be referred to herein as a direct group. An "inversion" group corresponding to a direct group is defined as a group of methods (also called "inversion" methods), that, when executed by the computing system, causes the computing system to at least partially undo the effects of the direct group.

Figure 4:
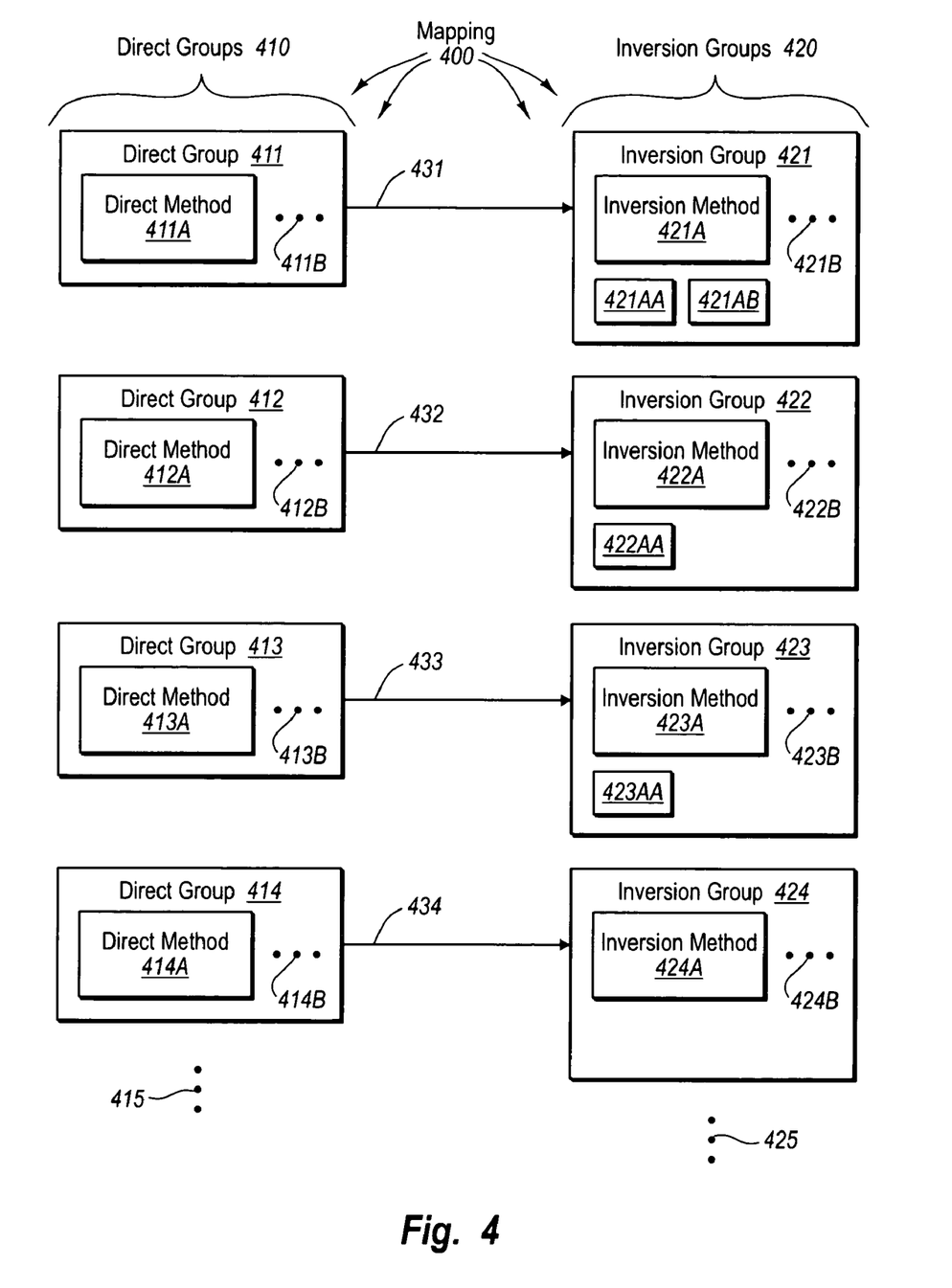
FIG. 4 illustrates a data structure of a mapping between groups of direct methods and groups of inversion methods.

The method 300 involves the maintaining of a mapping between each of a number of groups of one or more direct methods with a corresponding group of one or more inversion methods (act 301). FIG. 4 illustrates a data structure of a mapping 400 between groups of direct methods (i.e., direct groups 410) and groups of inversion methods (i.e., inversion groups 420).

In this example, direct groups 410 include direct groups 411 through 414 amongst potentially many more as represented by the vertical ellipses 415. Conventional computing technology allows for automated identification of all the methods present in a system. Similarly, inversion groups 420 includes inversion groups 421 through 424 amongst potentially many more as represented by the vertical ellipses 425. As illustrated, the direct group 411 is mapped 431 to inversion group 421; the direct group 412 is mapped 432 to inversion group 422; the direct group 413 is mapped 433 to inversion group 423; and the direct group 414 is mapped 434 to inversion group 424. The mapping may just be to an identification of the corresponding inversion group. Likewise, the inversion group may include just an identification of the inversion methods.

Each of the direct groups 411 through 414 may include just a single direct method 411A through 414A. However, the direct groups 411 through 414 may potentially include other direct methods as represented by the corresponding ellipses 411B through 414B. Likewise, each of the inversion groups 421 through 424 may include just a single inversion method 421 A through 424A. However, the inversion groups 421 through 424 may potentially include other inversion methods as represented by the corresponding ellipses 421 B through 424B.

The mapping may also identify one or more required parameters whose values should be transferred from the direct to the inversion methods. Suppose, for example, that a direct method is to add a name to a database, wherein the name value is specified as an input parameter to the direct method. The inversion method may be to delete a name with the database. The name may be listed as a necessary parameter indicating that whatever name value was used for the direct method, should also be used for the inversion method. There may be zero of more listed necessary parameters. The listed parameters may be input parameters or output parameters to the direct method.

In FIG. 4, inversion method 421A has associated listed parameters 421AA and 421AB, whose values should be taken from whatever associate parameter values were used when executing the direct method 411A. Inversion method 422A has a single associated parameter 422AA, whose value should be taken from whatever associated parameter value was used when executing the direct method 412A. Inversion method 423A has a single associated parameter 423AA, whose value should be taken from whatever associated parameter value was used when executing the direct method 413A. Inversion method 424A lists no necessary parameters that should be taken from parameter values used when executing the direct method 414A.

Accordingly, by executing inversion method 421A, and potentially the other inversion methods 421B in the inversion group 421, the computing system at least partially undoes the effects of the computing system having previously performed the direct method 411A and potentially the other inversion methods 411B in the direct group 411. Likewise, by executing the other inversion groups 422 through 424, the computing system at least partially undoes the effects of the computing system having previously performed the corresponding direct groups 412 through 414.

Returning to FIG. 3, once the mapping is properly maintained (act 301), the computing system performs a functional, result-oriented step for performing the transaction in a manner that the mapping is used to automatically generate compensation procedures that when executed by the one or more processors, cause the computing system to at least partially undo the effects of the transaction (step 310). While this may include any corresponding acts that accomplish this result, the step 310 is illustrated as including corresponding acts 311 through 314, and potentially 315 through 317 as well. The step may be repeated for each transaction to be performed.

Figure 5:
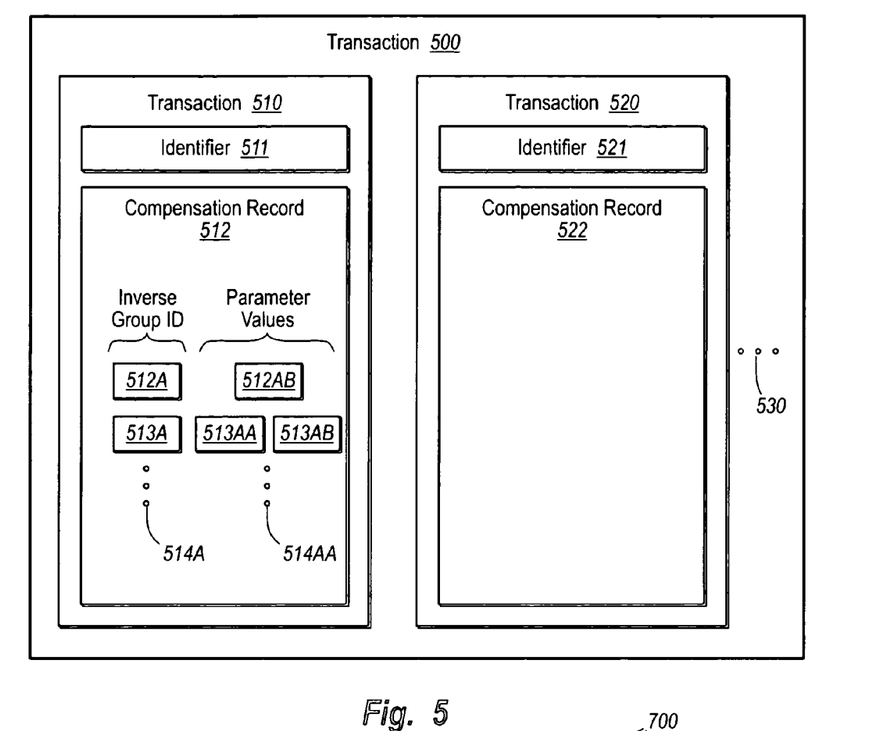
FIG. 5 illustrates a data structure of a larger transaction that includes multiple smaller transactions, each of the smaller transactions including direct methods and a corresponding compensation record that includes mapped inversion methods and potentially associated parameter values.

FIG. 5 illustrates a larger transaction 500 that includes a number of other transactions including transaction 510, transaction 520 amongst potentially others as represented by the horizontal ellipses 530. As previously mentioned, a transaction may be performed in response to having received a message in a message exchange pattern such as message exchange pattern 203. These message-based transaction correspond to the constituent transactions 510, 520 and 530 of the larger transaction 500. The larger transaction 500 corresponds to an entire message exchange pattern.

The transaction record 510 includes a transaction record identifier 511 and a corresponding compensation record 512. The compensation record 512 has stored an identification of inversion groups such as inversion groups 512A, 513A and potentially others as represented by the vertical ellipses 514A. Likewise, specific parameter values 512AB and 513AA and 513AB are included in the compensation record 512. The transaction record 520 also includes a transaction record identifier 521 as well as a compensation record 522. The other transaction records 530 may be similarly structured as described for the transaction record 510. The transactions may be already committed transactions, or transactions that have begun, but are not yet committed.

Returning to FIG. 3, in order to perform a transaction, the computing system first begins the transaction (act 311). At this stage, the computing system may establish a corresponding transaction record and assign a transaction record identifier. Optionally, the compensation record for the transaction may also be created at this time, although this could feasibly be delayed until information needs to be written to the compensation record.

The computing system then executes a direct group of method(s) appropriate for the transaction (act 312). In addition, the mapping is used to identify the corresponding inversion group (act 313). The identity of the inversion method is then recorded in the compensation record for the transaction (act 314). In addition, the actual parameter values used to execute any direct method may also be recorded for parameters identified as necessary for the inversion method in the mapping 400.

If there are more direct groups of methods in the transaction (the Yes branch in decision block 315), then the next group of direct methods is executed (act 312), the inversion group is identified (act 313), and recorded with any necessary parameter values (act 314). This is repeated until it is finally determined that there are no further groups of direct methods to be executed by the transaction (the No branch in decision block 315).

At that stage, the transaction is committed (act 316). The compensation record is optionally saved to a persistent media (act 317) upon committing the transaction. The persistent media may be any memory or storage media capable of storing data despite system failures. For example, referring to FIG. 1, the persistent media may be, for example, all or part of memory 104, removable storage 108, and/or non-removable storage 110. Although the compensation record is illustrated as being saved just after committing the transaction, this saving operation may be included as part of the transaction, and thus be performed just prior to committing the transaction. This would result in, for example, transaction record 510 in the larger transaction 500 being saved to a persistent media.

If there are more transactions (the Yes branch in decision block 318), then the step 310 would repeat for all of the transactions in the larger transaction 500. Otherwise (the No branch in decision block 318), the process ends until more transactions are to be performed.

Note that the compensation record for a transaction is automatically generated by compiling a collection of inversion groups and associated needed parameter values. Each of the inversion groups may be used and reused for multiple transactions. Custom code specifically dedicated to a particular transaction need not be developed, though the reusable constituent inversion methods may be developed. Since these inversion methods may be reused numerous times, there is less development cost associated with having the compensation record be automatically generated as compared to developing custom undo processes for each transaction.

Figure 6:
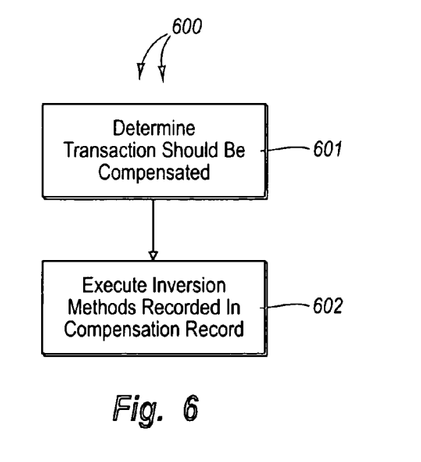
FIG. 6 illustrates a flowchart of a method for compensating a transaction without having to generate custom code dedicated to the transaction.

FIG. 6 illustrates a flowchart of a method 600 for compensating a transaction using the compensation record. When it is determined that a transaction (such as transaction 510) should be compensated (act 601), the inversion methods identified in the compensation record corresponding to the transaction (act 602) are executed using the associated necessary parameter values also included in the compensation group.

Figure 7:
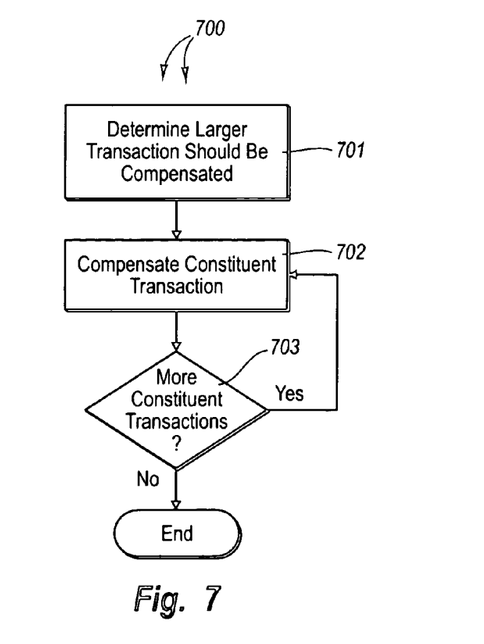
FIG. 7 illustrates a flowchart of a method for compensating a larger transaction including multiple smaller transactions.

FIG. 7 illustrates a method 700 for compensating a larger transaction (such as transaction 500) including multiple smaller transactions. Once it is determined that a larger transaction should be compensated (act 701), a corresponding constituent transaction is compensated (act 702) according to the method described above with respect to FIG. 6. Specifically, the inversion methods in the first compensation group are executed with the recorded parameter values. If there are more constituent transactions (the Yes branch in decision block 703), that constituent transaction is compensated (act 702) and so forth until there are no more constituent transactions left to be compensated (the No branch in decision block 703).

Although the transactions that are to be compensated are illustrated as being part of a larger transaction in FIG. 5, the principles of the present invention are even novel in view of a single transaction in that transactions may be undone without generating custom code dedicated to the transaction. Furthermore, when multiple such transactions are part of a larger transaction as illustrated in FIG. 5, the larger transaction may be a long running transaction that may last a matter of even years. By saving the compensation record to a persistent media upon compensating the transaction, the compensation record may survive system failures. This is important since system failures are more likely in long running transactions. Accordingly, there is need for flexibility in accommodating such disruptions. The ability to undo (as much as is feasible) a transaction that is part of that larger transaction is thus useful.

The principles of the present allow the transactions to be atomic, consistent, isolated, and durable. The transaction is atomic in that it is either completely performed, or is compensated for. Furthermore, the database is consistent at all times during the transaction. The transaction is isolated from other transactions by using race conditions to ensure that multiple transaction instances do not collide. Furthermore, these transactions are durable in that once a transaction commits, the transaction survives system failure. These attributes had previously been attributed to only short running transactions. However, with durability being extended to preserve state even in the midst of a transaction, these attributes are now possible with long running transactions using the principles of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method implemented in a computing system that includes one or more processors and system memory, the method for causing the computing system to execute a transaction of direct methods in a manner that the effects of the transaction may be at least partially undone even though a custom inversion process was not previously constructed for the transaction, the method comprising the following:

creating a mapping between each of a plurality of groups of one or more direct methods with a corresponding group of one or more inversion methods, wherein a direct method is a method undone by a group of one or more of the inversion methods;

after creating the mapping, beginning a transaction;

running a group of one or more direct methods as part of the transaction, the group being one of the plurality of groups of one or more direct methods;

within the transaction, using the mapping and identifying the corresponding group of one or more inversion methods corresponding to the group of one or more direct methods; and recording the identity of the corresponding group of one or more inversion methods in a compensation record for the transaction, wherein the corresponding group of one or more inversion methods is in the mapping and is reusable for a plurality of different transactions and, when invoked, undoes only a portion of the transaction, and independent of other transactions and other parts of the transaction, by undoing only actions of the transaction corresponding to the group of one or more direct methods run as a part of the transaction.

2. A method in accordance with claim 1, wherein the group of one or more direct methods is a first group of one or more transactions and the corresponding group of one or more inversion methods is a first group of one or more inversion methods, the method further comprising the following:

running a second group of one or more direct methods as at least part of the transaction, the second group being one of the plurality of groups of one or more direct methods;

using the mapping to identify the corresponding second group of one or more inversion methods corresponding to the second group of one or more direct methods; and recording the identity of the corresponding second group of one or more inversion methods in the compensation record.

3. A method in accordance with claim 2, further comprising the following:

committing the transaction.

4. A method in accordance with claim 3, further comprising the following:

saving the compensation record to a persistent media upon committing the transaction.

5. A method in accordance with claim 3, further comprising the following:

determining that the transaction should be compensated; and executing the inversion methods identified in the compensation group corresponding to the transaction.

6. A method in accordance with claim 3, wherein the transaction is a first transaction and the transaction record is a first transaction record, the method first comprising the following:

beginning a second transaction;

running a third group of one or more direct methods as at least part of the second transaction, the third group being one of the plurality of groups of one or more direct methods;

using the mapping to identify the corresponding third group of one or more inversion methods corresponding to the third group of one or more direct methods; and recording the identity of the corresponding third group of one or more inversion methods in a compensation record for the second transaction.

7. A method in accordance with claim 6, further comprising the following:

committing the second transaction.

8. A method in accordance with claim 7, wherein the first and second transaction are part of the same larger transaction.

9. A method in accordance with claim 8, further comprising the following:

determining whether a larger transaction should be compensated;

executing the inversion methods identified in the first compensation record corresponding to the first transaction in response to determining that a larger transaction should be compensated; and executing the inversion methods identified in the second compensation group corresponding to the second transaction in response to determining that a larger transaction should be compensated.

10. A method in accordance with claim 7, further comprising the following:

saving the second compensation record to a persistent media.

11. A method in accordance with claim 1, further comprising the following:

receiving a message, wherein beginning the transaction is performed in response to receiving a message.

12. A method in accordance with claim 11, wherein the message is a HyperText Transport Protocol (HTTP) message.

13. A method in accordance with claim 11, wherein the message is a Simple Object Access Protocol (SOAP) message.

14. A method in accordance with claim 1, wherein each of the plurality of groups of one or more direct methods each comprise a single method.

15. A method in accordance with claim 14, wherein each of the plurality of groups of one or more inverted methods each comprise a single inverted method.

16. A method in accordance with claim 1, wherein each of the plurality of groups of one or more inverted methods each comprises a single inverted method.

17. A method in accordance with claim 1, wherein creating a mapping comprises the following for at least one of the one or more direct methods in the group of one or more direct methods:

listing one or more parameters for the direct method that should be in the inverted method.

18. A method in accordance with claim 17, wherein running a group of one or more direct methods comprises the following:

running the direct method using particular values corresponding to the one or more listed parameters.

19. A method in accordance with claim 18, further comprising the following:

recording values for the one or more listed parameters for the direct method in the compensation record.

20. A method in accordance with claim 19, further comprising the following:

determining that the transaction should be compensated; and executing the inversion methods identified in the compensation group corresponding to the transaction, wherein the inversion method corresponding to the direct method is executed using the recorded values in the compensation record.

21. A computer program product for use in a computing system that includes one or more processors and system memory, the computer program product for performing a method for the computing system to execute a transaction of one or more direct methods in a manner that the effects of the transaction may be at least partially undone even though a custom inversion process was not previously constructed for the transaction, the computer program product comprising:

one or more computer-storage media having stored thereon computer-executable instructions that, when executed by the one or more processors, cause the computing system to:

create a mapping between each of a plurality of groups of direct methods with a corresponding group of inversion methods that, when executed by the one or more processors of the computing system, cause the computing system to at least partially undo the effects of the execution of the corresponding group of direct methods, wherein a direct method is a method undone by a group of one or more of the inversion methods;

maintain the mapping between each of the plurality of groups of direct methods with a corresponding group of inversion methods;

after creating the mapping, begin a transaction;

run each of a group of direct methods as at least part of the transaction, the group being one of the plurality of groups of direct methods;

within the transaction, use the mapping and identify the corresponding group of inversion methods corresponding to the group of direct methods; and record the identity of the corresponding group of inversion methods in a compensation record for the transaction, wherein the corresponding group of one or more inversion methods is in the mapping and is reusable for a plurality of different transactions and, when invoked, undoes only a portion of the transaction, and independent of other transactions and other parts of the transaction, by undoing only actions of the transaction corresponding to the group of one or more direct methods run as a part of the transaction.

22. A computer program product in accordance with claim 21, wherein the group of one or more direct methods is a first group of one or more transactions and the corresponding group of one or more inversion methods is a first group of one or more inversion methods, the computer program product further having thereon computer-executable instructions that, when executed by the one or more processors, further cause the computing system to perform the following:

run a second group of direct methods as at least part of the transaction, the second group being one of the plurality of groups of direct methods;

use the mapping to identify the corresponding second group of inversion methods corresponding to the second group of direct methods; and record the identity of the corresponding second group of inversion methods in the compensation record.

23. A computer program product in accordance with claim 22, the computer program product further having thereon computer-executable instructions that, when executed by the one or more processors, further cause the computing system to perform the following:

commit the transaction.

24. A computer program product in accordance with claim 23, the computer program product further having thereon computer-executable instructions that, when executed by the one or more processors, further cause the computing system to perform the following:

save the compensation record to a persistent media upon committing the transaction.

25. A computer program product in accordance with claim 23, the computer program product further having thereon computer-executable instructions that, when executed by the one or more processors, further cause the computing system to perform the following:

determining that the transaction should be compensated; and executing the inversion methods identified in the compensation group corresponding to the transaction.

26. A computer program product in accordance with claim 23, wherein the transaction is a first transaction and the compensation record is a first compensation record, the computer program product further having thereon computer-executable instructions that, when executed by the one or more processors, further cause the computing system to perform the following:

beginning a second transaction;

running a third group of direct methods as at least part of the second transaction, the third group being one of the plurality of groups of direct methods;

using the mapping to identify the corresponding third group of inversion methods corresponding to the third group of direct methods; and recording the identity of the corresponding third group of inversion methods in a compensation record for the second transaction.

27. A computer program product in accordance with claim 26, the computer program product further having thereon computer-executable instructions that, when executed by the one or more processors, further cause the computing system to perform the following:

committing the second transaction.

28. A computer program product in accordance with claim 27, wherein the first and second transaction are part of the same larger transaction.

29. A computer program product in accordance with claim 28, further comprising the following:

determining whether a larger transaction should be compensated;

executing the inversion methods identified in the first compensation group corresponding to the first transaction in response determining that a larger transaction should be compensated; and executing the inversion methods identified in the second compensation group corresponding to the second transaction.

30. A computer program product in accordance with claim 27, further comprising the following:

saving the second compensation record to a persistent media.

31. A computer program product in accordance with claim 21, further comprising the following:

receiving a message, wherein beginning the transaction is performed in response to receiving the message.

32. A method in accordance with claim 21, wherein each of the plurality of groups of direct methods each comprise a single method.

33. A method in accordance with claim 32, wherein each of the plurality of groups of inverted methods each comprise a single inverted method.

34. A method in accordance with claim 21, wherein each of the plurality of groups of inverted methods each comprises a single inverted method.

35. A method in accordance with claim 21, wherein creating a mapping comprises the following for at least one of the direct methods in the group of direct methods:
  listing one or more parameters for the direct method that should be in the inverted method.

36. A method in accordance with claim 35, wherein running a group of direct methods comprises the following:
  running the direct method using particular values corresponding to the listed parameters.

37. A method in accordance with claim 36, further comprising the following:
  recording values for the listed parameters for the direct method in the compensation record.

38. A method in accordance with claim 37, further comprising the following:
  determining that the transaction should be compensated; and
  executing the inversion methods identified in the compensation group corresponding to the transaction, wherein the inversion method corresponding to the direct method is executed using the recorded values in the compensation record.

39. A computer program product in accordance with claim 21, wherein the one or more computer-storage media are physical memory media.

40. A computer program product in accordance with claim 39, wherein the physical memory media include system memory.

41. A computer program product in accordance with claim 39, wherein the physical memory media include a persistent media.

42. A method implemented in a computing system that includes one or more processors and system memory, the method for causing the computing system to execute a message-based transaction within a larger transaction, the message-based transaction having one or more methods, and in a manner that the effects of the message-based transaction may be at least partially undone even though a custom inversion process was not previously constructed for the message-based transaction, the method comprising the following:
  creating and maintaining a mapping between each of a plurality of groups of one or more direct methods with a corresponding group of one or more inversion methods that, when executed by the one or more processors of the computing system, cause the computing system to at least partially undo the effects of the execution of the corresponding group of one or more direct methods, wherein a direct method is a method undone by a group of one or more of the inversion methods, and wherein the inversion methods in the mapping are reusable for a plurality of different transactions, wherein the mapping includes:
    a plurality of direct groups, and for each of a plurality of direct groups, one or more direct methods executable by the computing system to accomplish at least a part of the message-based transaction;
    a plurality of inversion groups, and for each of the plurality of inversion groups:
      one or more inversion methods executable by the computing system to at least partially undo effects of at least one of the plurality of direct groups; and
      one or more parameters whose value should be taken from a direct method of a corresponding direct group to at least partially undo the effects of at least one of the plurality of direct groups; and
    a link from each of the plurality of direct groups to a corresponding inversion group;
  receiving a message having a message exchange pattern;
  after creating and maintaining the mapping, and in response to receiving the message, performing at least the message-based transaction within the larger transaction in a manner that the mapping is used to automatically generate compensation procedures that when executed by the one or more processors, cause the computing system to at least partially undo the effects of the message-based transaction, wherein performing the message-based transaction includes:
    beginning the message-based transaction by establishing a transaction record, assigning a transaction record identifier, and creating a compensation record for the transaction;
    executing a first group of direct methods from the plurality of direct groups, and thereby running direct methods as part of the message-based transaction;
    using the mapping, identifying the corresponding group of inversion methods corresponding to the first group of direct methods; and
    recording the identity of the corresponding group of inversion methods in a compensation record for the message-based transaction, wherein the compensation record:
      is included in the message-based transaction that is within the larger transaction;
      is associated with a transaction record identifier;
      has stored therein an identification of an inversion group identification corresponding to an inversion group in the mapping, which inversion group in the mapping, when executed, undoes the effects of only a portion of the message-based transaction, wherein the inversion group in the mapping that is executed to undo the effects of only a portion of the message-based transaction is reusable for a plurality of different transactions and, when invoked, undoes actions independent of other transactions and other parts of the message-based transaction, by undoing only actions of the message-based transaction corresponding to the first group of direct methods run as part of the message-based transaction; and
      has stored therein one or more specific parameter values corresponding to the one or more parameters in the corresponding inversion group of the mapping;
    determining that the larger transaction should be compensated;
    after determining that the larger transaction should be compensated, using the compensation record that was automatically generated by compiling a collection of inversion groups and associated parameter values to compensate the message-based transaction, and by executing the corresponding group of inversion methods together with associated parameter values; and
    using additional compensation records in the larger transaction to compensate additional constituent transactions within the larger transaction.

* * * * *